United States Patent Office 3,504,099
Patented Mar. 31, 1970

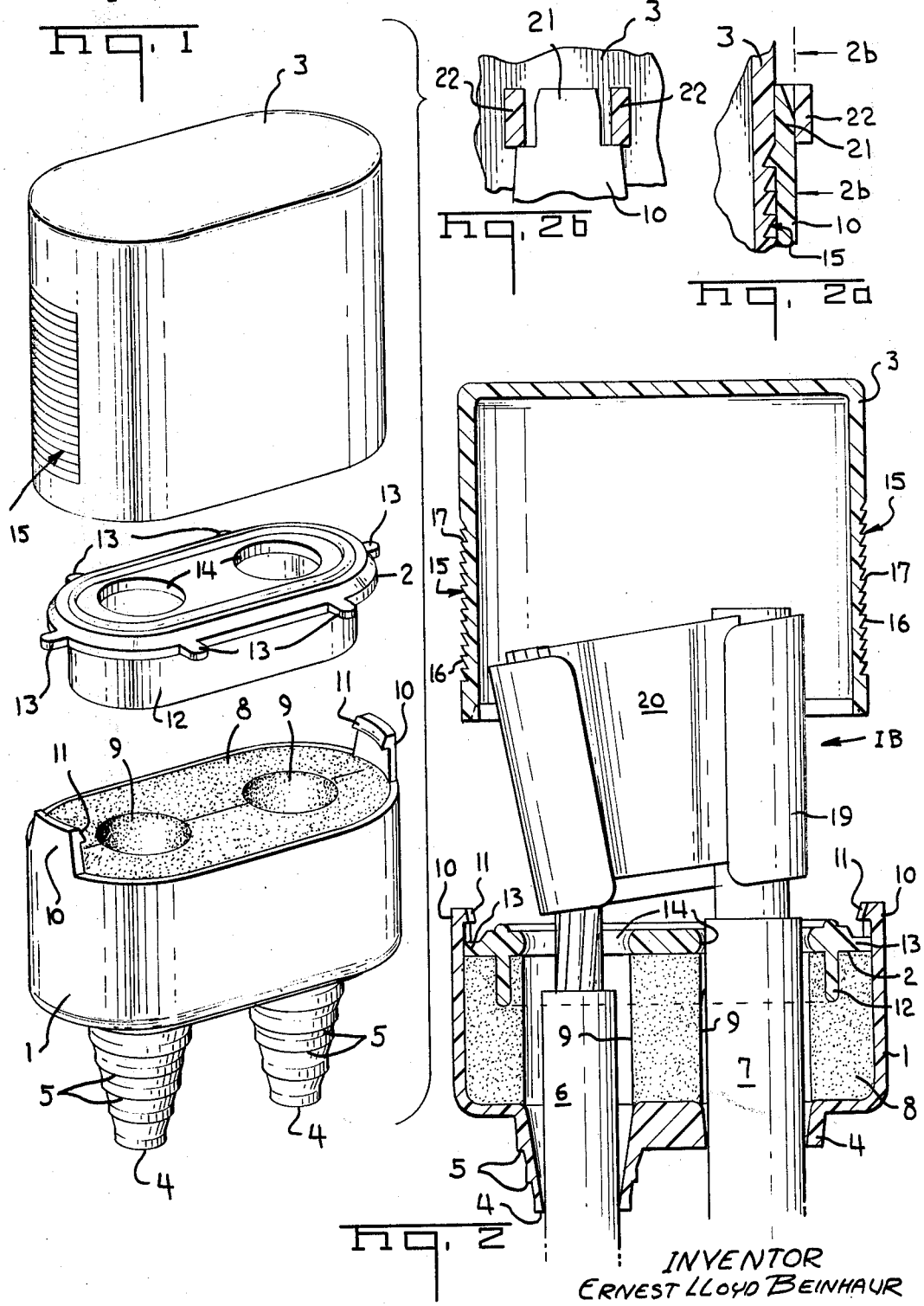

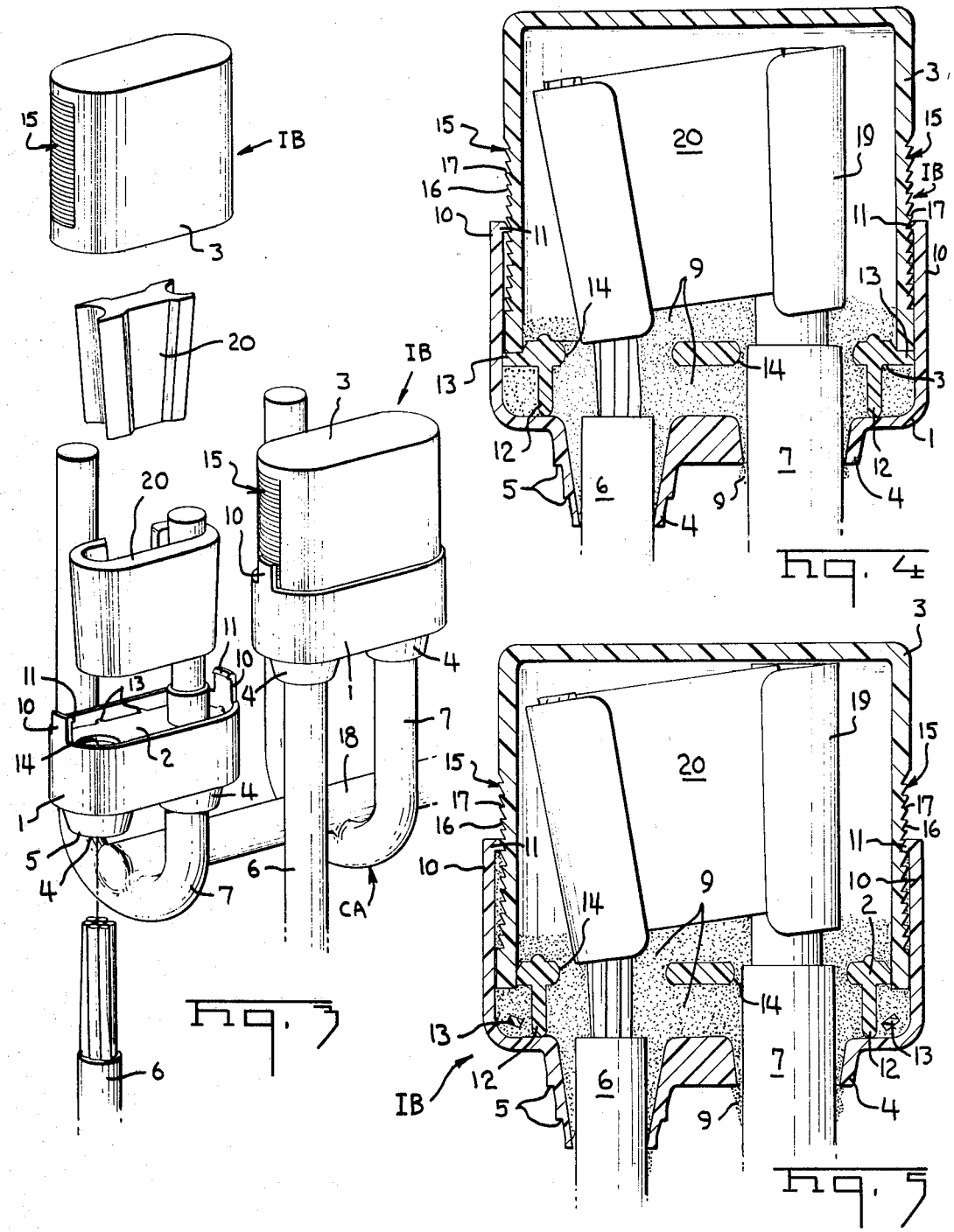

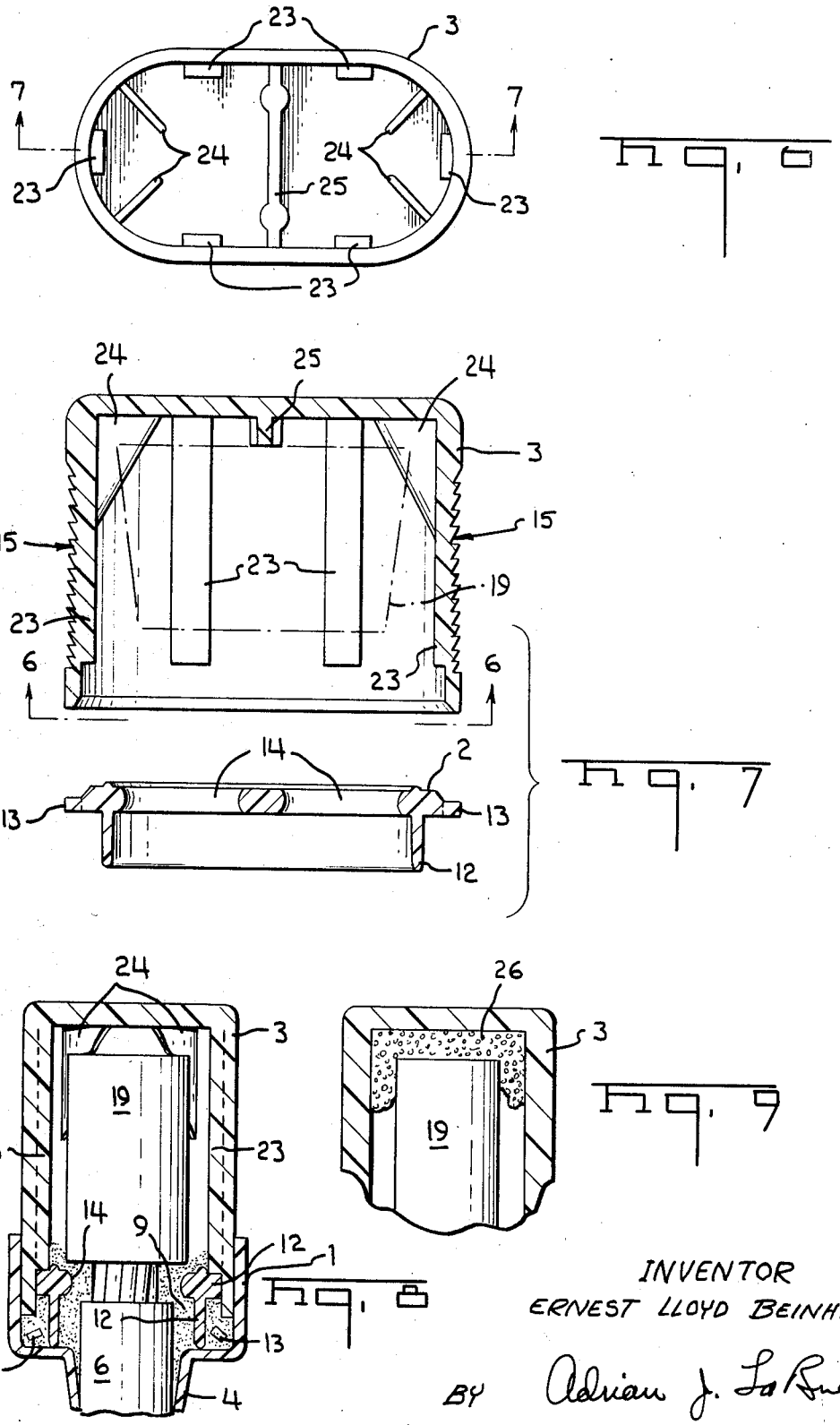

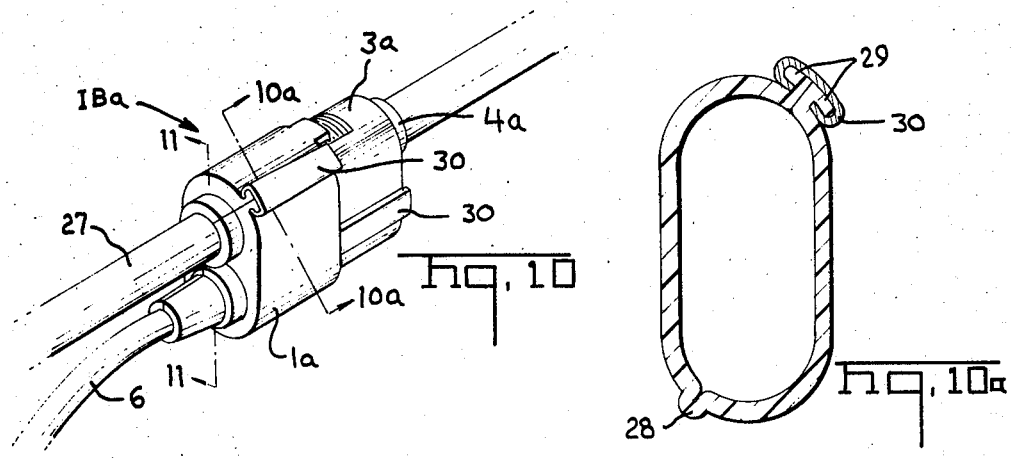
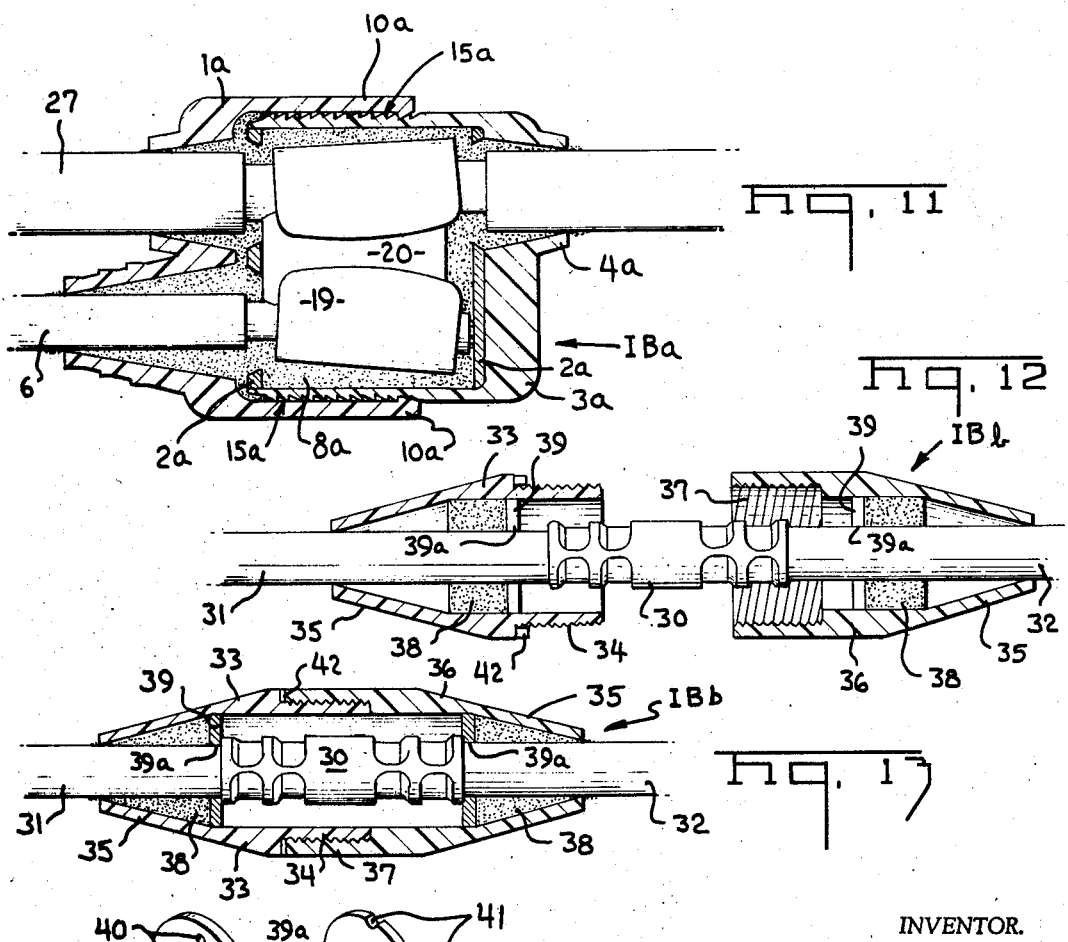

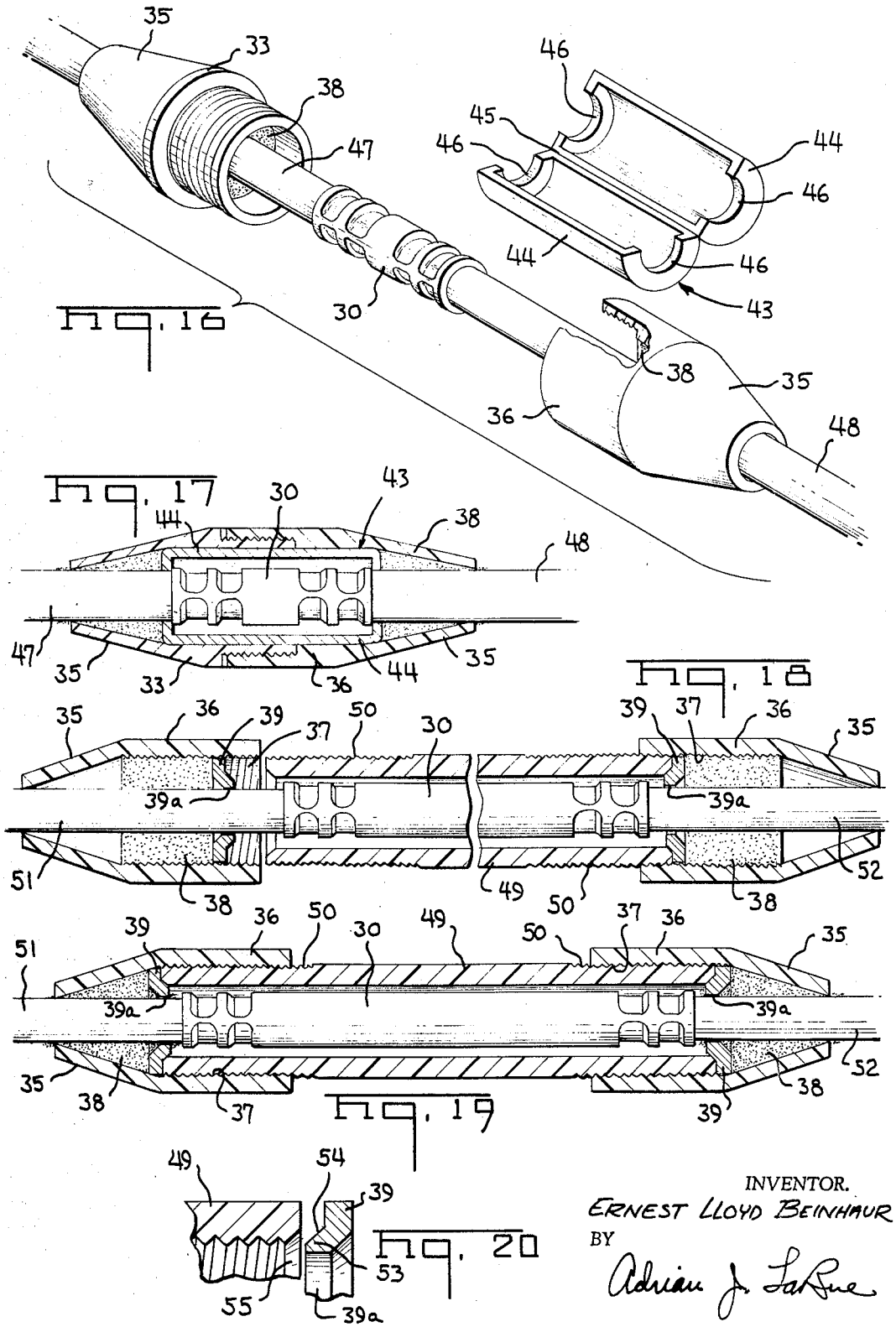

3,504,099
ELECTRICAL CONNECTIONS AND INSULATING
BOOT THEREFOR
Ernest Lloyd Beinhaur, Harrisburg, Pa., assignor to
AMP Incorporated, Harrisburg, Pa.
Filed Aug. 1, 1968, Ser. No. 749,490
Int. Cl. H02g 3/02
U.S. Cl. 174—72 22 Claims

ABSTRACT OF THE DISCLOSURE

An insulation boot for an electrical connection comprises a housing into which conductor means extends through an opening thereof for connection with a connector to form the electrical connection, a flowable sealing compound in the housing and having a piston for engagement therewith, a cover latchably mateable with the housing so that when the housing and cover are forcefully moved into latchable engagement the electrical connection drives the piston into engagement with the sealing compound causing the sealing compound to sealingly engage the conductor means and provide a seal at the opening and between the housing and the cover.

---

This invention relates to insulation covers and more particularly to insulation boots for electrical connections to be used underground.

Electrical conductors in the utility field are being buried underground to provide protection for the equipment and to eliminate the costly replacement costs of the existing equipment aboveground. This movement to bury the utility conductors is economical today because of the equipment to bury the conductors as opposed to the cost of the equipment to maintain utility facilities aboveground. The effective sealed insulation of underground connections has been a continuing problem in the movement of conductors to underground installations. Many proposals have been made but they have proved ineffective to provide a reliable sealed insulated underground connection that will last for the required period of time.

An object of the invention is to provide an insulation boot for an electrical connection which effects a sealed connection as a result of assembling the boot onto the connection.

Another object of the invention is the provision of an insulation boot for an electrical connection which includes sealing means operable to effect a sealed connection when the boot is moved into position around the connection.

A further object of the invention is to provide an insulation boot for an electrical connection which includes means to accommodate different sizes of conductor means.

An additional object of the invention is the provision of an insulation boot for an electrical connection which has stabilizing means therein to stabilize the electrical connection within the boot.

A still further object of the invention is to provide an insulation boot for an electrical connection which has means to limit the movement of the cap member into the receptacle member.

Still a further object of the invention is the provision of stop means on the piston means limiting movement of the piston means into the receptacle member.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is an exploded perspective view of an insulation boot;

FIGURE 2 is a cross-sectional view of the insulation boot of FIGURE 1 in position on an electrical connection with the cap member exploded therefrom;

FIGURE 2a is a part cross-sectional view of a locking and stopping means for the insulation boot;

FIGURE 2b is a view taken along lines 2b—2b of FIGURE 2a;

FIGURE 3 is a perspective exploded view of a completely assembled electrical connection assembly and the elements of the electrical connection assembly prior to being completed;

FIGURE 4 is a cross-sectional view of the completely assembled electrical connection assembly;

FIGURE 5 is a view similar to FIGURE 4 with the cap member driven further into the receptacle member;

FIGURE 6 is a view taken along line 6—6 of FIGURE 7 and illustrating an embodiment of the invention;

FIGURE 7 is a view taken along lines 7—7 of FIGURE 6;

FIGURE 8 is a cross-sectional view of the insulation boot on an electrical connection assembly and stabilized in position within the insulation boot by stabilizing means;

FIGURE 9 is a part cross-sectional view of a further embodiment of the stabilizing means;

FIGURE 10 is a perspective view of a further embodiment of the invention in use on a through cable;

FIGURES 10a and 11 are views taken respectively along lines 10a—10a and 11—11 of FIGURE 10;

FIGURE 12 is a cross-sectional view of an additional embodiment of the invention prior to being secured on a compression splice;

FIGURE 13 is a view similar to FIGURE 12 illustrating the insulation boot thereof in an assembled condition;

FIGURE 14 is a perspective view of one type of piston means to be used in the insulation boot of FIGURES 12 and 13;

FIGURE 15 is an alternative embodiment of the piston means to be used in the insulation boot of FIGURES 12 and 13;

FIGURE 16 is an exploded perspective view of still a further embodiment of the invention;

FIGURE 17 is a cross-sectional view of the insulation boot of FIGURE 16 in an assembled condition;

FIGURE 18 is a cross-sectional view of a still further embodiment of the invention;

FIGURE 19 is a view similar to FIGURE 18 with the insulation boot in an assembled condition; and FIGURE 20 is a part cross-sectional view of a feature of the sleeve and piston member of the embodiment of FIGURES 18 and 19.

Turning now to the drawings and especially FIGURES 1 through 5, there is illustrated in insulation boot 1B which comprises a receptacle member 1, a piston member 2 and a cap member 3. Receptacle member 1 includes conically-shaped conductor-receiving sections 4 which are provided with stepped areas 5 along the exterior surfaces thereof. Depending upon the size of electrical conductors 6 and 7 to pass through conductor-receiving sections 4, these conductor-receiving sections 4 are cut to size to receive the electrical conductors therethrough by selecting the appropriate stepped area 5 along the conductor-receiving sections and these sections are then cut thereat to permit the electrical conductors to be passed therethrough as illustrated in FIGURES 2 through 5. The stepped areas 5 along conductor-receiving sections 4 therefore permit the conductor-receiving sections to be cut to size to accommodate different sizes of electrical conductors.

A flowable sealing mastic 8 is disposed within receptacle member 1 and openings 9 are provided in mastic 8 in communication with conductor-receiving sections 4. This sealing mastic is conventional, flowable under pressure and stable under extreme environments within which the connection assembly would be subjected.

Stiffly-flexible latching arms 10 extend outwardly from the end of receptacle member 1 opposite the end from which conductor-receiving sections 4 extend and these latching arms are provided with latching projections 11.

Piston member 2 is positioned on top of mastic 8 and is provided with a skirt 12 for disposition within mastic 8 to maintain the piston member in position. Skirt 12 also is engageable with the bottom of receptacle member 1 to thereby limit the movement of piston member 2 within receptacle member 1. Projections 13 are provided on piston member 2 and these projections guide piston member 2 in its movement within receptacle member 1 and permits mastic 8 to flow above piston member 2 as it is being moved within the receptacle member so that the mastic flows between the receptacle member and the cap member to form a seal therebetween. Holes 14 are provided in piston member 2 in communication with openings 9 so that the electrical conductors 6 and 7 can extend therethrough.

Cap member 3 fits snugly within receptacle member 1 and onto projections 13. Serrated areas 15 are provided in the outer surface of cap member 3 which are in alignment with latching arms 10. Serrated areas 15 include inclined surfaces 16 and latching surfaces 17 for engagement by latching projections 11 to latch cap member 3 in position on receptacle member 1. Inclined surfaces 16 are disposed in such a manner that latching projections 11 move along serrated areas 15 to the position whereby they engage the proper latching surfaces 17 in a ratcheting manner to latch cap member 3 in a proper position.

In assembly, conductors 6 and 7 are stripped of their insulation to bear the conductive portions thereof and conductor-engaging sections 4 are cut at the appropriate stepped areas 5 to accommodate conductors 6 and 7. Conductor 7 is part of a conductor assembly CA illustrated in FIGURE 3 which comprises U-shaped conductors connected at spaced intervals along rod 18 and the whole connector assembly coated with a suitable dielectric material by a conventional fluidized bed coating process. It is to be understood, however, that connector 7 can be singular and similar to that of stranded conductor 6.

With conductors 6 and 7 in position in receptacle member 1, these conductors are connected together by means of a connector assembly including connector body 19 and a wedge 20 which is completely described in U.S. Patent 3,235,944 and the connection is accomplished in accordance with the teaching in U.S. Patent 3,343,294. Once the conductors 6 and 7 have been connected together by the connection assembly, cap member 3 is moved into engagement with receptacle member 1 and cap member 3 is forcefully driven into receptacle member 1 thereby driving piston member 2 along receptacle member 1 as a result of the engagement of cap member 3 onto projections 13 thereby causing sealing mastic 8 to flow around conductors 6 and 7 and into conductor-receiving sections 4 as well as between receptacle member 1 and cap member 3 until skirt 12 engages the bottom of receptacle member 1 as illustrated in FIGURE 4 to provide an effectively sealed connection. Latching arms 10 engage in a ratcheting manner the appropriate latching surfaces of serrated areas 15 thereby securely latching cap member 3 and receptacle member 1 together. Skirt 12 acts to also direct the sealing mastic around conductors 6 and 7 and into conductor-receiving sections 4.

If too much pressure is applied in pushing cap member 3 within receptacle member 1, projections 13 are sheared off as illustrated in FIGURE 5 and cap member 3 will bottom in receptacle member 1.

FIGURES 2a and 2b illustrate extensions 21 extending outwardly from latching arms 10 and these extensions are disposed in loops 22 which are integral with cap member 3 and are located at the outer ends of errated areas 15. Loops 22 are of proper configuration to permit extensions 21 to be disposed therein and to be engaged by latching arms 10 to define stop means limiting the movement of cap member 3 within receptacle member 1. The disposition of extensions 21 within loops 22 prevents the accidental movement of latching arms 10 out of engagement with a latching surface 17 of serrated areas 15.

Cap member 3 as illustrated in FIGURES 6 through 8 is provided with internal projections 23 which terminate inwardly from the entrance to cap member 3 and these projections engage piston member 2 as illustrated in FIGURE 8 when cap member 3 has been fully inserted into receptacle member 1 to the point of shearing projections 13 off of piston member 2 to define stop means thereby limiting the movement of cap member 3 within receptacle member 1.

Ribs 24 extend outwardly from the inner wall of cap member 3 as well as the bottom surface thereof. Pairs of ribs 24 are disposed on each side of a stop and strengthening rib 25 and each pair of ribs is directed toward one another as illustrated in FIGURE 6. Ribs 24 are engageable by connector body 19 of the connector assembly and deformed thereby as illustrated in FIGURE 8 when cap member 3 is latchably secured in receptacle member 1 and these ribs stabilize the connector assembly within cap member 3.

Instead of ribs 24, a compressible substance 26 such as, for example, Styrofoam or the like, can be used which is engaged and compressed by the connector assembly when cap member 3 is latchably secured in receptacle member 1 thereby stabilizing the connector assembly within cap member 3 as illustrated in FIGURE 9.

Stop and strengthening rib 25 acts as a stop against which the connector assembly abuts and it provides clearance for overhang of conductors 6 and 7 which extend outwardly beyond the connector assembly.

FIGURES 10, 10a and 11 illustrate insulation boot IBa which is to be used in conjunction with an insulated through conductor 27 to which is connected conductor 6 in the form of a tap cable via connector body 19 and wedge 20 connecting the stripped portions of conductors 6 and 27 together. Receptacle member 1a and cap member 3a are split along their lengths and provided with integral hinge means 28 so that these members can be assembled around the connector assembly. Tapered lugs 29 are provided at the splits of the receptacle and cap members and these are engaged by the correspondingly tapered C-shaped clamping member 30 to hold the split receptacle and cap members in position around the connection assembly.

Cap member 3a is provided with a conductor-receiving section 4a which has been cut to the proper dimension so that conductor 27 can pass therethrough. Sealing mastic 8a is moved into sealing engagement in conductor-receiving sections 4a of receptacle member 1a around conductors 6 and 27 and into conductor-receiving section 4a of cap member 3a by piston members 2a and the cap member is forcefully pushed into the receptacle member and latching arms 10a secure these members together along serrated areas 15a. Thus, the insulation boot of FIGURES 10, 10a, and 11 is similar to that heretofore disclosed.

Insulation boot IBb of FIGURES 12 and 13 is for use on a compression splice 30 that has been crimped onto conductors 31 and 32 to electrically splice these conductors together. Insulation boot IBb includes a sleeve 33 provided with a threaded area 34 and a conical conductor-receiving section 35 which is disposed on conductor 31 prior to this conductor being crimped onto compression splice 30. Sleeve 36 has a threaded area 37 which is mateable with threaded area 34 and it includes a conical conductor-receiving section 35. Sleeve 36 is placed onto conductor 32 prior to this conductor being crimped in compression splice 30. Sleeve 33 and 36 are provided with sealing mastic 38 and pistons 39 which are discs and they are provided with openings 39a through which the conductors pass and holes 40 extending therethrough as illustrated in FIGURE 14.

After sleeves 33 and 36 are positioned on conductors 31 and 32 and these conductors are connected together via compression splice 30, sleeves 33 and 36 are threadably connected together via threaded areas 34 and 37 and pistons 39 are driven along sleeves 33 and 36 via engagement with the ends of compression splice 30 thereby forcing mastic 38 into conductor-receiving sections 35 and around conductors 31 and 32 thereby providing a sealed connection as illustrated in FIGURE 13. Holes 40 cause excess amounts of mastic to extrude through the pistons and around the compression splice adjacent the pistons. Instead of holes 40, pistons 39 can be provided with notches 41 at their outer peripheries as illustrated in FIGURE 15. A sealing ring 42 is provided on threaded area 34 to form a seal between threaded areas 34 and 37.

Conductor-receiving sections 35 can be similar to conductor-receiving sections 4 of the embodiment described in conjunction with FIGURES 1 through 5 so that conductor-receiving sections 35 may be provided with stepped areas to facilitate selecting the appropriate diameters to accommodate the various sizes of conductors with which insulation boot IBb is to be used. Pistons 39 can also be provided with skirts similar to skirt 12 illustrated in conjunction with the embodiment of FIGURES 1 through 5.

In the embodiment of FIGURES 16 and 17, pistons 39 are replaced by a unitary piston 43 which comprises semi-cylindrical members 44 hingedly connected together via integral hinge means 45 so that members 44 can be closed around compression splice 30, members 44 being provided with arcuate depressions 46 in the ends thereof to provide clearance for conductors 47 and 48.

In assembly, piston 43 is mounted over compression splice 30 and sleeves 33 and 36 are threaded together causing the ends of piston 43 to move mastic 38 into conductor-receiving sections 35. Unitary piston 43 is used in place of pistons 39 when the outside diameter of conductors 47 and 48 is equal to or greater than the outside diameter of compression splice 30.

In case compression splice 30 is long as illustrated in FIGURES 18 and 19, sleeve 49 provided with threaded areas 50 is disposed over compression splice 30 and threaded areas 50 are threadably engaged in threaded areas 37 of sleeve 36 thereby forcing pistons 39 to move mastic 38 into conductor-engaging sections 35 and into engagement with conductors 51 and 52 as illustrated in FIGURE 19.

Piston 39 can be provided with an extension 53 having a bevelled surface 54 which mates with tapered surface 55 at the ends of sleeve 49 thereby forming a seal therebetween via the mastic which precludes reliance on the threads for sealing purposes.

Sleeves 33 and 36 are provided with exterior serrated or roughened surfaces to enable hand tightening of the sleeves when threaded together. If necessary, a strap wrench can be used or the exterior surfaces can be provided with configurations for engagement by conventional wrench means.

Insulation boots IB as disclosed hereinbefore, are molded in accordance with conventional molding practices from a suitable dielectric material that will endure the extreme environments like the mastic. The insulation boots have been disclosed as having specific configurations but it is to be noted that they can take any desirable configuration to accomplish the intended result.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. An insulation boot for sealingly covering an electrical connection assembly connecting together insulated electrical conductors comprising a receptacle member having conductor-receiving sections through which conductors can be extended and connected together by an electrical connection assembly, flowable sealing mastic in said receptacle member, piston means disposed on said sealing mastic and having a configuration corresponding to that of said receptacle member so as to be movable therealong, said mastic and said piston means having openings in communication with said conductor-receiving sections so that ends of the conductors can be passed therethrough for connection together by the connection assembly, cap means having a configuration corresponding to that of said receptacle member and having an open end adapted to fit within said receptacle member and to be moved along said receptacle member to cover said connection assembly, said open end being engageable with said piston means thereby driving said piston means as said cap means is being moved into said receptacle member whereby said sealing mastic is forced into said conductor-receiving sections and between said receptacle member and said cap means to provide a sealed connection, and latching means provided between said receptacle member and said cap means for latching said receptacle member and said cap means together.

2. An insulation boot according to claim 1 wherein said conductor-receiving sections have stepped areas along an exterior surface thereof to facilitate cutting the conductor-receiving sections at appropriate locations to accommodate the conductors.

3. An insulation boot according to claim 1 wherein said piston means includes skirt means that is disposed within said sealing mastic to hold said piston means in position and to move said sealing mastic around said conductors and into said conductor-receiving sections when said piston means is moved into said receptacle member via said open end of said cap means.

4. An insulation boot according to claim 1 wherein said piston means includes projections extending outwardly from a periphery thereof for guiding said piston means along said receptacle member and permitting said sealing mastic to flow between said receptacle member and said cap means as said open end engages said projections and drives said piston means along said receptacle member.

5. An insulation boot according to claim 1 wherein said piston means includes stop means for engagement with a bottom surface of said receptacle member to limit the movement of said piston means within said receptacle member.

6. An insulation boot according to claim 1 wherein said latching means include stiffly-flexible latching arms extending outwardly from one of said receptacle member and said cap means and serrated area means along one of said receptacle member and said cap means in alignment with said latching arms.

7. An insulation boot according to claim 1 wherein stop means is provided between said receptacle member and said cap means to limit movement of said cap means into said receptacle member.

8. An insulation boot according to claim 1 wherein said latching means include means to maintain said latching means in position and means to limit movement of said cap means into said receptacle member.

9. An insulation boot according to claim 1 wherein stabilizing means is provided within said cap means for engagement with the connection assembly thereby stabilizing the connection assembly within said cap means when said cap means is latchably secured on said receptacle member and sealingly covering the connection assembly.

10. An insulation boot according to claim 1 wherein stop means is provided on said cap means for engagement with said piston means after said piston means has moved to its final position in said receptacle member thereby limiting the movement of said cap means in said receptacle member.

11. An insulation boot according to claim 1 wherein said cap means is provided with stop rib means for engagement by the connection assembly.

12. An insulation boot according to claim 1 wherein said receptacle member and said cap means include hinge means and they are longitudinally split to enable said receptacle member and said cap means to be positioned over the connection assembly connected onto one of the conductors which is a through conductor, and securing means along said longitudinal slits for securing said receptacle member and said cap means in position.

13. An insulation boot according to claim 11 wherein said cap means includes a conductor-receiving section to accommodate the through conductor, additional sealing mastic is disposed in said cap means, and additional piston means is positioned on said additional sealing mastic.

14. An insulation boot for sealingly covering electrical connection means connecting together insulated-conductor means comprising sleeve means having conductor-receiving means through which insulated-conductor means can be passed and connected together by electrical connection means, flowable sealing mastic in said sleeve means, piston means disposed adjacent said sealing mastic, said piston means and said sealing mastic having openings in communication with said conductor-receiving means so that ends of the conductor means can be passed therethrough for connection together by the connection means, securing means provided by said sleeve means for securing said sleeve means together around the connection means when said sleeve means are moved into engagement with each other, and means for driving said piston means thereby moving said sealing mastic into said conductor-receiving means and sealingly around the conductor means.

15. An insulation boot according to claim 14 wherein said piston means are engaged by ends of the connection means when the sleeve means are moved into engagement with each other thereby constituting said driving means.

16. An insulation boot according to claim 14 wherein said piston means comprises semi-cylindrical members hingedly connected together for closing around the connection means and defining unitary piston means, ends of said semi-cylindrical members having arcuate depressions to provide clearance for the conductor means and these ends being engageable with said sealing mastic, said unitary piston means constituting said driving means.

17. An insulation boot according to claim 14 wherein said driving means includes sleeve member means secureable via said securing means in said sleeve means and having ends for engagement with and for driving said piston means.

18. An insulation boot according to claim 14 wherein said piston means comprise discs having holes therethrough.

19. An insulation boot according to claim 14 wherein said piston means comprise discs having notches in outer peripheries thereof.

20. An insulated electrical connection comprising a connection assembly having a rod member and conductor members extending outwardly therefrom at spaced intervals therealong, said connection assembly being covered with insulating material and one of said conductor members having a free end bared, and insulated conductor having one end stripped of insulation, connection means electrically connecting said bared and stripped ends together, and an insulation boot covering said connection means and along portions of the insulated conductor and the one conductor member, said insulation boot including a first and a second member, said first member having conductor-receiving sections through which the portions of the conductor and conductor member extend and sealing mastic in said conductor-receiving sections and around said portions of the insulated conductor and said conductor member, said second member having an open end positioned within said first member with said sealing mastic disposed between said members, and latching means provided by said first and second members latchably securing these members in sealing position around the connection means and along the portions of the insulated conductor and the one conductor member.

21. An insulation boot for sealingly covering an electrical connection means connecting together insulated conductor means comprising first and second members with at least one of said members having conductor-receiving means and sealing mastic, piston means disposed adjacent said sealing mastic, said sealing mastic and said piston means having openings in communication with said conductor-receiving means so that the conductor means can be passed through said conductor-receiving means and said openings and connected together via the connection means, securing means provided by said first and second members for securing these members together when they are moved into engagement, and driving means for driving said piston means against said sealing mastic thereby moving said sealing mastic into said conductor-receiving means, around the conductor means and along said first and second members whereby a sealed connection is established.

22. An insulation boot according to claim 21 wherein said conductor-receiving means are provided on each of said first and second members and said sealing mastic and said piston means are provided in said first and second members.

References Cited

UNITED STATES PATENTS

| | | | |
|---|---|---|---|
| 2,906,810 | 9/1959 | D'Ascoli | 174—76 XR |
| 2,938,940 | 3/1960 | Calendine et al. | 174—76 |
| 3,395,382 | 7/1968 | Weagant | 174—91 XR |

DARRELL L. CLAY, Primary Examiner

U.S. Cl. X.R.

29—628; 174—76, 138; 339—115